US012600377B2

(12) United States Patent
Zhang

(10) Patent No.: US 12,600,377 B2
(45) Date of Patent: Apr. 14, 2026

(54) COOPERATIVE VEHICLE INFRASTRUCTURE INFORMATION PROCESSING METHOD AND APPARATUS, AND TERMINAL DEVICE

(71) Applicant: DATANG GOHIGH INTELLIGENT AND CONNECTED TECHNOLOGY (CHONGQING) CO., LTD., Chongqing (CN)

(72) Inventor: Jie Zhang, Chongqing (CN)

(73) Assignee: DATANG GOHIGH INTELLIGENT AND CONNECTED TECHNOLOGY (CHONGQING) CO., LTD., Chongqing (CN)

( * ) Notice: Subject to any disclaimer, the term of this patent is extended or adjusted under 35 U.S.C. 154(b) by 301 days.

(21) Appl. No.: 18/277,976

(22) PCT Filed: Jun. 21, 2022

(86) PCT No.: PCT/CN2022/100100
§ 371 (c)(1),
(2) Date: Aug. 18, 2023

(87) PCT Pub. No.: WO2022/268071
PCT Pub. Date: Dec. 29, 2022

(65) Prior Publication Data
US 2024/0124015 A1 Apr. 18, 2024

(30) Foreign Application Priority Data

Jun. 22, 2021 (CN) .......................... 202110690562.3

(51) Int. Cl.
*B60W 60/00* (2020.01)
*B60W 50/14* (2020.01)

(52) U.S. Cl.
CPC .......... *B60W 60/001* (2020.02); *B60W 50/14* (2013.01); *B60W 2050/146* (2013.01)

(58) Field of Classification Search
CPC .............. B60W 60/001; B60W 50/14; B60W 2050/146
See application file for complete search history.

(56) References Cited

U.S. PATENT DOCUMENTS

2018/0365533 A1 12/2018 Sathyanarayana et al.
2020/0189611 A1 6/2020 Raichelgauz et al.
(Continued)

FOREIGN PATENT DOCUMENTS

CN 110053629 A 7/2019
CN 114115781 A * 3/2022 ........... G06F 3/1454
(Continued)

OTHER PUBLICATIONS

The extended European search report of family EP application No. 22827564.0 issue on Jul. 18, 2024.
(Continued)

*Primary Examiner* — Vivek D Koppikar
*Assistant Examiner* — Jeffrey R Chalhoub
(74) *Attorney, Agent, or Firm* — The Sun IP Law

(57) ABSTRACT

The present disclosure provides a cooperative vehicle infrastructure information processing method and apparatus, and a terminal device. The method includes: receiving a plurality of pieces of event information sent by an information sensor device; and in a case that at least two target events among the plurality of pieces of event information are driving decision-making homogeneous events, merging the at least two target events to generate a composite event, wherein the driving decision-making homogeneous events are events having a preset influence relationship.

12 Claims, 5 Drawing Sheets

(56) References Cited

U.S. PATENT DOCUMENTS

| 2020/0255028 | A1 | | 8/2020 | Raichelgauz | |
| 2021/0158701 | A1 | * | 5/2021 | Cho | |
| 2022/0301427 | A1 | * | 9/2022 | Ueno | H04N 7/18 |
| 2022/0319311 | A1 | * | 10/2022 | Yousaf | G08G 1/0112 |

FOREIGN PATENT DOCUMENTS

| JP | 2019134425 | A | 8/2019 |
| JP | 2021026554 | A | 2/2021 |
| WO | 2020244787 | A1 | 12/2020 |

OTHER PUBLICATIONS

The first office action of corresponding JP application No. 2023-579594, issued on Dec. 3, 2024.

* cited by examiner

1

COOPERATIVE VEHICLE INFRASTRUCTURE INFORMATION PROCESSING METHOD AND APPARATUS, AND TERMINAL DEVICE

CROSS-REFERENCE TO RELATED APPLICATION

This disclosure claims the priority of Chinese patent application No. 202110690562.3 filed in China on Jun. 22, 2021, the content of which is incorporated by reference herein in its entirety as part of this disclosure.

TECHNICAL FIELD

The present disclosure relates to the field of communication technologies, in particular to, a cooperative vehicle infrastructure information processing method and apparatus, and a terminal device.

BACKGROUND

Vehicle to Everything (V2X) is an information communication technology that connects vehicles with surrounding objects. Through the V2X, vehicles can organically connect important traffic participation elements, and can be supported to obtain more information than a single vehicle. After the vehicles obtain the information, the information can be generally displayed on a Human Machine Interface (HMI) system to help drivers perform comprehensive control on surrounding environments.

However, with the development of cooperative vehicle infrastructure systems, more and more pieces of information are obtained through the V2X, leading to the following problems: an information processing method at an application level is unrelated to the decision-making ability of a user; a processing method of correlation and priority ignores a relationship between events; and an information displaying processing method lacks personalized processing.

SUMMARY

Embodiments of the present disclosure provide a cooperative vehicle infrastructure information processing method and apparatus, and a terminal device.

In order to solve the above technical problems, an embodiment of the present disclosure provides the following technical solutions:

An embodiment of the present disclosure provides an information processing method, applied to a terminal device and including:

a plurality of pieces of event information sent by an information sensor device is received; and in a case that at least two target events among the plurality of pieces of event information are driving decision-making homogeneous events, the at least two target events are merged to generate a composite event, wherein the driving decision-making homogeneous events are events having a preset influence relationship.

In some embodiments, the method further includes:

the composite event is displayed according to a preset displaying manner; and the displaying manner includes at least one of the following manners: voice, text, and icon.

In some embodiments, in a case that the at least two target events among the plurality of pieces of event information are the driving decision-making homogeneous events, before the at least two target events are merged to generate the composite event, the method further includes:

according to a preset time range, at least two first events are determined from the plurality of pieces of event information received in sequence; and according to a preset expiration date range, the at least two target events are determined from the at least two first events.

according to the preset time range, the at least two first events are determined from the plurality of pieces of event information received in sequence may also be understood as: at least two first events are determined from the plurality of pieces of event information received in sequence within the preset time range.

In some embodiments, the preset influence relationship includes at least one of the following items:

a causal relationship, the causal relationship is configured to indicate that a first target event is a cause of a second target event;

an influence amplification relationship, the influence amplification relationship is configured to indicate that an effect of the second target event is amplified after the first target event occurs;

an influence attenuation relationship, the influence attenuation relationship is configured to indicate that an effect of the second target event is attenuated after the first target event occurs;

a time series relationship, the time series relationship is configured to indicate that the second target event occurs after the first target event; and a new event generation relationship, the new event generation relationship is configured to indicate that the first target event and the second target event cause occurrence of a third target event.

In some embodiments, the at least two target events are merged to generate the composite event includes:

according to a preset composite event template, merging processing is performed on the composite event to generate the composite event;

the preset composite event template includes: a triggering event of the at least two target events, a conditional event in the at least two target events, action information established according to the at least two target events, and displaying behavior information for displaying the at least two target events;

wherein the preset composite event template further includes time information of the conditional event and location information of the conditional event; and the displaying behavior information includes at least one of the following: voice broadcast information and icon information.

In some embodiments, according to the preset displaying manner, the composite event is displayed further includes:

the composite event is filtered according to a preset filtering condition; and the filtered composite event is displayed according to the preset displaying manner.

In some embodiments, the composite event is displayed according to the preset displaying policy further includes:

the composite event is broadcasted to a first terminal located within a preset distance range of the terminal device.

In some embodiments, the method further includes:

in an automatic driving mode of a vehicle, a driving control policy is generated according to the composite event; and the vehicle is controlled to automatically drive according to the driving control policy.

An embodiment of the present disclosure further provides a terminal device, including a processor, a memory, and programs or instructions stored on the memory and runnable on the processor, wherein the programs or instructions, when executed by the processor, implement the steps of the above information processing methods.

An embodiment of the present disclosure further provides an information processing apparatus, applied to a terminal device and including:

a receiving module, configured to receive a plurality of pieces of event information sent by an information sensor device; and a composite event generation module, configured to merge, in a case that at least two target events among the plurality of pieces of event information are driving decision-making homogeneous events, the at least two target events to generate a composite event, wherein the driving decision-making homogeneous events are events having a preset influence relationship.

In some embodiments, the apparatus further includes:

a displaying module, configured to display the composite event according to a preset displaying manner; and the displaying manner includes at least one of the following manners: voice, text, and icon.

In some embodiments, the apparatus further includes:

a first determining module, configured to determine, according to a preset time range, at least two first events from the plurality of pieces of event information received in sequence; and a second determining module, configured to determine the at least two target events from the at least two first events according to a preset expiration date range.

according to the preset time range, at least two first events are determined from the plurality of pieces of event information received in sequence may also be understood as: at least two first events are determined from the plurality of pieces of event information received in sequence within the preset time range.

In some embodiments, the preset influence relationship includes at least one of the following items:

a causal relationship, the causal relationship is configured to indicate that a first target event is a cause of a second target event;

an influence amplification relationship, the influence amplification relationship is configured to indicate that an effect of the second target event is amplified after the first target event occurs;

an influence attenuation relationship, the influence attenuation relationship is configured to indicate that an effect of the second target event is attenuated after the first target event occurs;

a time series relationship, the time series relationship is configured to indicate that the second target event occurs after the first target event; and a new event generation relationship, the new event generation relationship is configured to indicate that the first target event and the second target event cause occurrence of a third target event.

In some embodiments, the composite event generation module includes:

a composite event generation unit, configured to perform merging processing on the composite event according to a preset composite event template to generate the composite event;

the preset composite event template includes: a triggering event of the at least two target events, a conditional event in the at least two target events, action information established according to the at least two target events, and displaying behavior information for displaying the at least two target events;

wherein the preset composite event template further includes time information and location information of the conditional event; and a displaying unit, configured to implement that the displaying behavior information includes at least one of the following: voice broadcast information and icon information.

In some embodiments, the display unit is further configured to:

filter the composite event according to a preset filtering condition; and display the filtered composite event according to the preset displaying manner.

In some embodiments, the display unit is further configured to:

broadcast the composite event to a first terminal located within a preset distance range of the terminal device.

In some embodiments, the apparatus further includes:

a driving policy generation module, configured to: in an automatic driving mode of a vehicle, generate a driving control policy according to the composite event; and a control module, configured to control the vehicle to automatically drive according to the driving control policy.

An embodiment of the present disclosure further provides a readable storage medium, wherein the readable storage medium stores programs or instructions, wherein the programs or instructions, when executed by a processor, implement the steps of the above information processing methods.

DETAILED DESCRIPTION OF THE EMBODIMENTS

In order to make the objectives, the technical solutions, and the advantages of the present disclosure clearer, the present disclosure will be described in detail below in combination with the accompanying drawings and specific embodiments.

The present disclosure provides an information processing method and apparatus, and a terminal device, so as to solve the problem in the prior art that more and more information are obtained through a V2X and cannot be processed deeply, leading to disconnection from a decision-making process of a driver.

Figure 1:
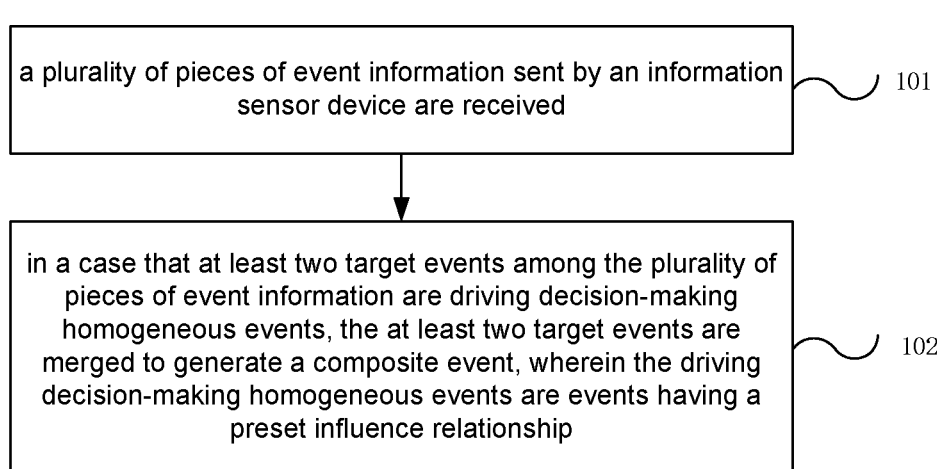
FIG. 1 is a first flow chart of an information processing method according to an embodiment of the present disclosure.

As shown in FIG. 1, an embodiment of the present disclosure provides an information processing method, applied to a terminal device and including:

Step 101: a plurality of pieces of event information sent by an information sensor device are received.

Figure 2:
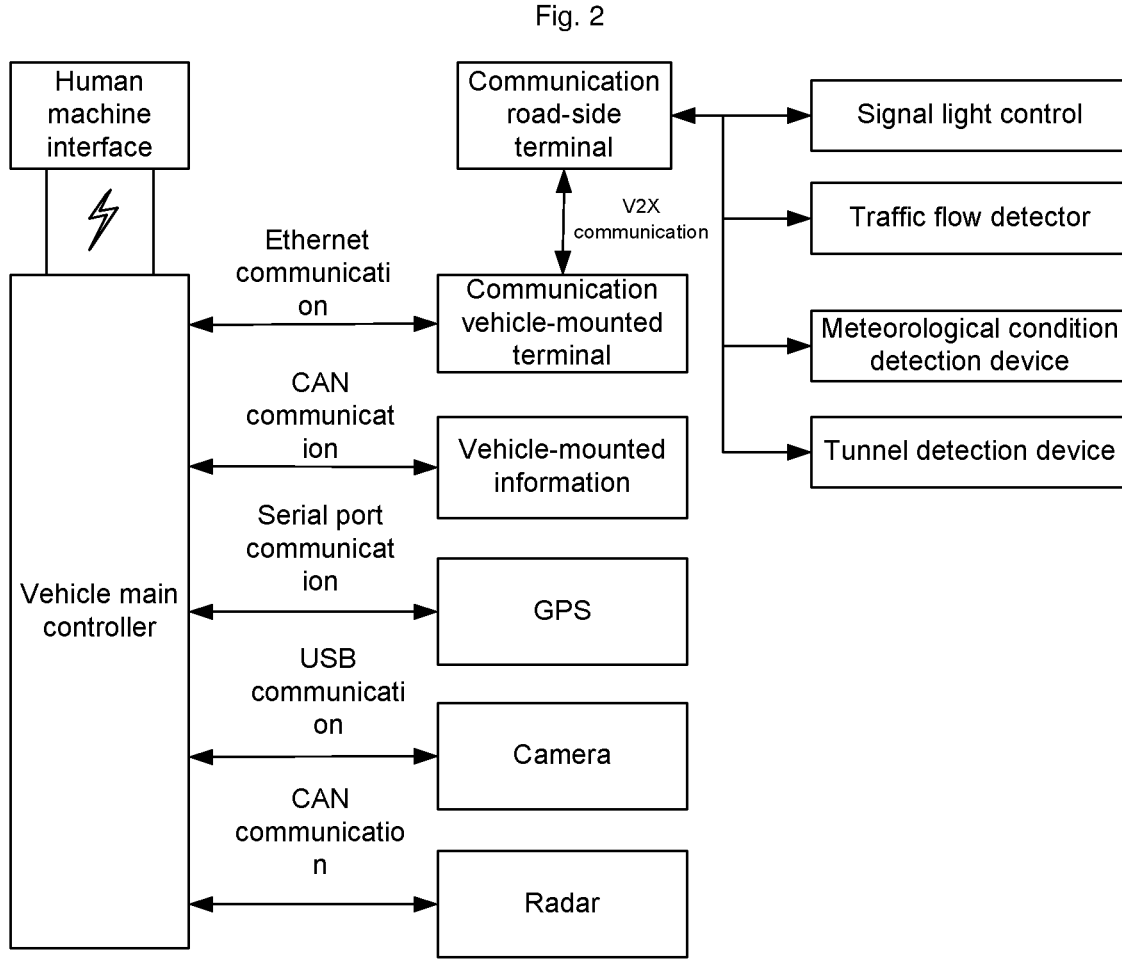
FIG. 2 is a schematic structural diagram of a system of a V2X scenario according to an embodiment of the present disclosure.

It should be noted that as shown in FIG. 2, all systems used in a V2X scenario generally have a vehicle-mounted device, a roadside device, a Global Positioning System (GPS), a sensing device, and the like, and these devices communicate with a vehicle main controller, such as Ethernet communication, Controller Area Network (CAN) communication, serial port communication, and Universal Serial Bus (USB) communication, and V2X communication. The plurality of pieces of event information are transmitted to the vehicle main controller after being processed by the one or more devices.

In this embodiment of the present disclosure, the information sensor device may be one or several of the aforementioned devices.

The plurality of pieces of event information refer to two or more pieces of event information.

The terminal device may be a vehicle device, such as a vehicle main controller or a vehicle-mounted terminal, or may be other apparatuses or devices on the vehicle that can process information. The terminal device may also be an electronic device with an operating processing system, such as a mobile phone, a tablet computer, or a wearable device, or may be other electronic devices with display screens and processors, or may be a Software Development Kit (SDK) that supports V2X, or a rule engine of a cloud.

Step 102: in a case that at least two target events among the plurality of pieces of event information are driving decision-making homogeneous events, the at least two target events are merged to generate a composite event, wherein the driving decision-making homogeneous events are events having a preset influence relationship.

In this embodiment of the present disclosure, by means of establishing a certain engine rule, it is recognized whether there is a certain relationship between the pieces of event information in driving decision making within a certain time and space window, for example, whether there is driving decision-making homogeneity. If it is determined that two or more target events in the event information are driving decision-making homogeneous events, the target events are merged to generate the composite event, so that a user can perform decision-making processing according to the decision-making ability of the user for the composite event.

It should be noted that the user usually feels confused in dealing with multiple events in very short time. Firstly, understanding the events takes time. Secondly, decision-making is complex. Displaying the multiple events simultaneously or in sequence can increase the decision-making burden on the user. Therefore, in this embodiment of the present disclosure, by means of receiving a plurality of pieces of event information sent by an information sensor device, in a case that at least two target events among the plurality of pieces of event information are driving decision-making homogeneous events, the at least two target events are merged to generate a composite event, wherein the driving decision-making homogeneous events are events having a preset influence relationship, so that the receiving efficiency of V2X information can be improved, and event conflicts are processed by using the relevance of the events, which prevents the problem of disconnection of the occurrence of the plurality of events from the decision-making process of a driver.

In some embodiments, the method further includes:

the composite event is displayed according to a preset displaying manner.

The displaying manner includes at least one of the following manners: voice, text, and icon.

In this embodiment of the present disclosure, a new displaying manner is further provided to display the composite event to play a role of visual assistance for a decision of the user.

Figure 3:
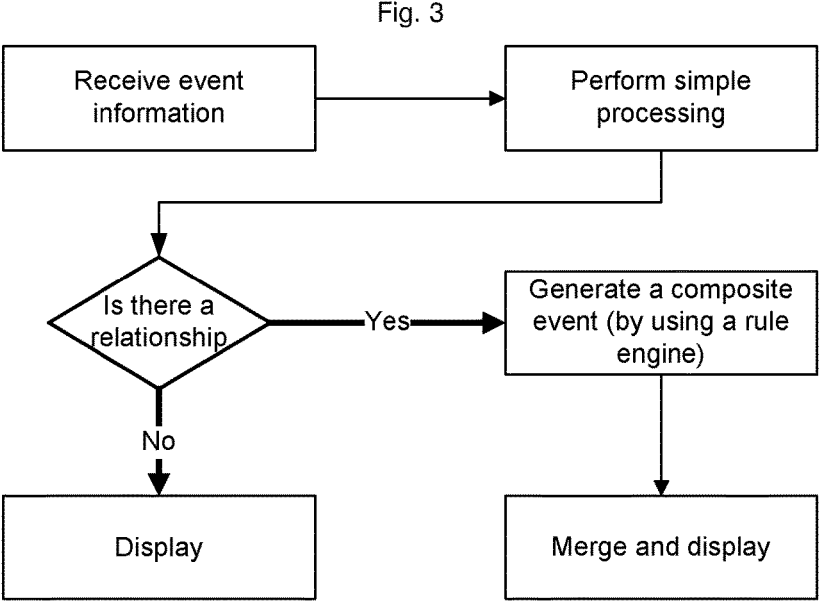
FIG. 3 is a second flow chart of an information processing method according to an embodiment of the present disclosure.

The information processing method provided in this embodiment of the present disclosure will be described below in combination with FIG. 3. The terminal device receives a plurality of pieces of event information sent by an information sensor device, determines, on the basis of simple processing of the event information, whether there is a relationship between events, and merges, in a case that there is a certain relationship (such as driving decision-making homogeneity) between the events, the events by using a rule engine, to generate a composite event. For a composite event setting rule, whether a new display manner is required to achieve a visual assistance effect is determined according to the decision-making ability of a user.

Figure 4:
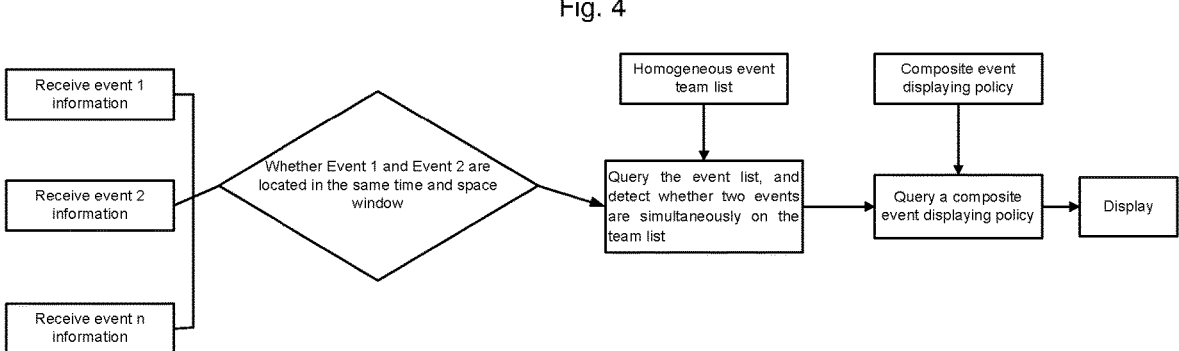
FIG. 4 is a first specific flow chart of an information processing method according to an embodiment of the present disclosure.

The information processing method provided in this embodiment of the present disclosure will be specifically described below in combination with FIG. 4.

The terminal device receives event 1 information, event 2 information, . . . , and event n information, a total of n pieces of event information. Whether event 1 and event 2 are in the same time and space window, that is, whether Event 1 and Event 2 have effectively occurred within the same preset time period, and whether an occurrence location is within a preset location range are determined. If it is determined that Event 1 and Event 2 have occurred in the same time and space window, whether Event 1 and Event 2 are in the homogeneous event team list at the same time is queried according to a preset homogeneous event team list. If Event 1 and Event 2 are in the homogeneous event team list at the same time, it indicates that Event 1 and Event 2 are homogeneous events, and Event 1 and Event 2 are merged to generate the composite event. A composite event displaying policy is queried, and the composite event is displayed according to the displaying policy.

In some embodiments, before the step that the at least two target events are merged in a case that at least two target events among the plurality of pieces of event information are driving decision-making homogeneous events, to generate a composite event, the method further includes:

at least two first events are determined, according to a preset time range, from the plurality of pieces of event information received in sequence; and the at least two target events are determined from the at least two first events according to a preset expiration date range.

That at least two first events are determined, according to a preset time range, from the plurality of pieces of event information received in sequence may also be understood as follows: at least two first events are determined from the plurality of pieces of event information received in sequence within a preset time range.

The preset time range may be understood as a time sliding window with a preset length, and at least two events, located within the time sliding window, among the plurality of pieces of event information are determined as the at least two first events.

It should be noted that the so-called decision-making homogeneity refers to the fact that the user will make a unique driving decision when seeing two or more pieces of information. The driving decision-making homogeneity has the following criteria: two or more events occur simultaneously (within a preset time period), and the time is all within an expiration date; and two or more events have influence on each other.

It should be noted that a specific type of a preset expiration date range is not limited here. For example, the preset expiration date range may refer to a preset time range, and a specific determination manner for determining the at least two target events according to the preset expiration date range can refer to the following expression.

Each first event correspondingly has a timestamp. When the timestamp of a first event is within the preset time range, the first event can be determined as a target event.

Figure 5:
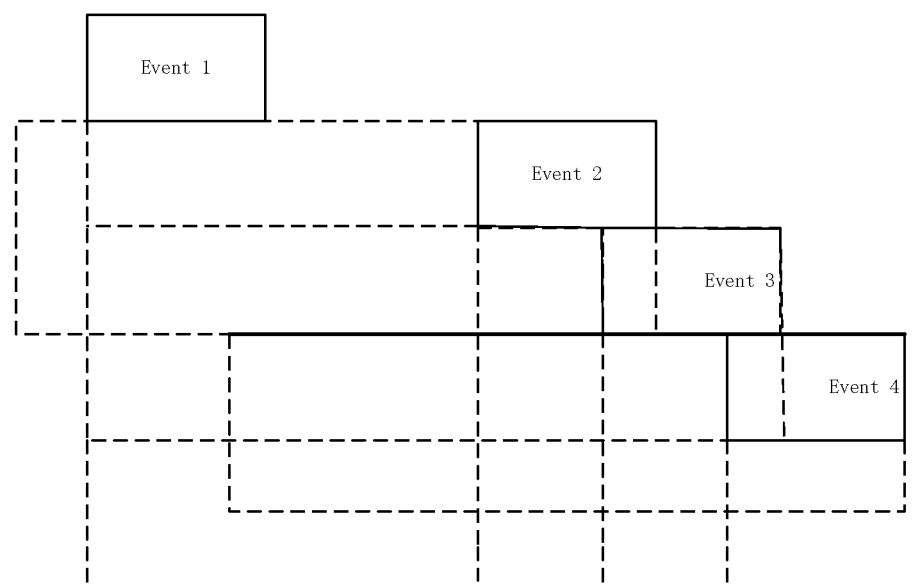
FIG. 5 is a schematic diagram of a time window according to an embodiment of the present disclosure.

For example, theoretically, there is a possibility that any two or more kinds of traffic events can occur simultaneously. The so-called simultaneous occurrence means that two or more pieces of event information are received by a terminal within a certain time range. As shown in FIG. 5, four events (Event 1, Event 2, Event 3, and Event 4) occur in sequence. The solid line box represents an expiration date range of an event (which can be understood as a timestamp corresponding to the event), and the dashed line box represents an occurrence time range of an event (which can be understood as a preset time range). At Time 2, Event 1 and Event 2 satisfy conditions of simultaneous occurrence. At Time 3, Event 1, Event 2, and Event 3 are events that occur simultaneously. At Time 4, only Event 2, Event 3, and Event 4 are events that occur simultaneously. Although Event 1, Event 2, and Event 3 used to occur simultaneously, at Time 4, Event 1 cannot continue to be considered as a simultaneously occurred event because Event 1 has expired.

For another example, the preset expiration date range can refer to a preset buffering area range. The preset buffering area range can be understood as a preset range centered around a vehicle. A specific determination method for determining the at least two target events according to the preset expiration date range can refer to the following expression:

An influence space range, namely, a continuous spatial coverage in space, of a first event is calculated. The influence space range of the first event is determined according to a start position corresponding to start of the first event and an end position corresponding to end of the first event. When the influence space range is located within the preset buffering area range, it is determined that the first event is included within the preset buffering area range, that is, the first event can be determined as a target event.

In some embodiments, the preset influence relationship includes at least one of the following items:

a causal relationship, the causal relationship being configured to indicate that a first target event is a cause of a second target event;

an influence amplification relationship, the influence amplification relationship being configured to indicate that an effect of the second target event is amplified after the first target event occurs;

an influence attenuation relationship, the influence attenuation relationship being configured to indicate that an effect of the second target event is attenuated after the first target event occurs;

a time series relationship, the time series relationship being configured to indicate that the second target event occurs after the first target event; and a new event generation relationship, the new event generation relationship being configured to indicate that the first target event and the second target event cause occurrence of a third target event.

It should be noted that the reason why two or more events have the decision-making homogeneity is that these events have mutual influences. These influence relationships include: the causal relationship, the influence amplification relationship, the influence attenuation relationship, the time series relationship, the new event generation relationship, and the like.

The above influence relationships are described and explained below by taking Event 1 and Event 2 as an example.

Causal relationship: Event 1 is the cause of Event 2.

Influence amplification relationship: After the occurrence of event 1, the consequences of event 2 may strengthen.

Influence attenuation relationship: An effect of Event 2 is attenuated after Event 1 occurs.

Time series relationship: Event 2 usually occurs after Event 1.

New event generation relationship: Event 1 and the Event 2 cause occurrence of a new vent.

It should be noted that the influence of an event is confirmed through prior knowledge. Therefore, the influence of the event can be identified through questionnaire surveys or statistical analysis of a past event database.

In some embodiments, that the at least two target events are merged to generate a composite event includes:

merging processing is performed on the composite event according to a preset composite event template to generate the composite event;

the preset composite event template includes: a triggering event of the at least two target events, a conditional event in the at least two target events, action information established according to the at least two target events, and displaying behavior information for displaying the at least two target events;

wherein the preset composite event template further includes time information and location information of the conditional event; and the displaying behavior information includes at least one of the following: voice broadcast information and icon information.

In this embodiment of the present disclosure, a triggering event and a conditional event are determined from two homogeneous events, and action information and displaying behavior information are established according to the two events. If there are other pieces of event information, they can also be selected to be merged and processed.

Two events of receiving a red light warning and receiving wet and slippery road information within one minute are taken as an example below, and a generated composite event can be defined according to a template shown in Table 1 below.

TABLE 1

| | | | Displaying behavior definition | |
|---|---|---|---|---|
| Triggering event | Condition | Action | | Others |
| Receive red light warning | Receive wet and slippery road information within one minute | Establish a red light event and a wet and slippery road event | If the red light event is within an expiration date range, stop the broadcasting of the wet and slippery road information, broadcast the red light event. The icon is replaced with red light & wet and slippery | If there is another event between the red light event and the wet and slippery road event, the merge still works. |

It should be noted that each composite event can be defined according to the above template. Time and location windows are defined in the above template. The time and location windows represent correlation detection. A composite event definition set is a merge validity determining rule base.

In the related technology, after a single event is received, the single event is understood, and actions that can be taken are determined and are correspondingly taken. At the same time, if another single event is received, this single event is understood separately, and actions that can be taken are determined. In a case that a large number of events are obtained, the obtained event information may be disconnected from a driving decision-making process.

Figure 6:
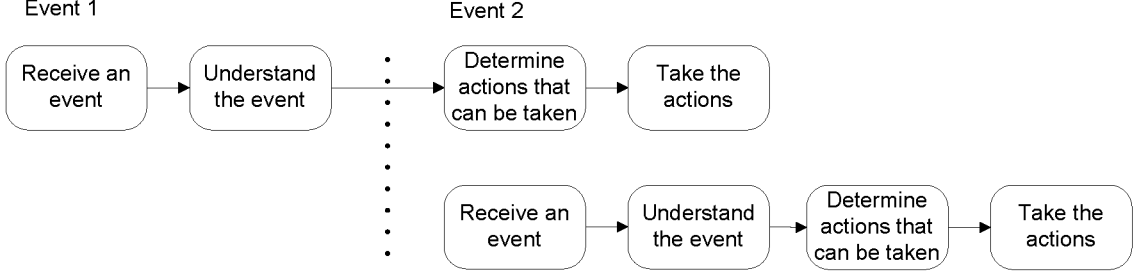
FIG. 6 is a schematic diagram of a driving decision-making path according to an embodiment of the present disclosure.

After composite event definition is completed, a decision-making path is as shown in FIG. 6.

After Event 1 is received, in the process of understanding the event, if Event 2 is received, Event 1 and Event 2 are merged to generate a composite event for uniform understanding, and actions that can be taken are determined and are taken.

In some embodiments, that the composite event is displayed according to the preset displaying policy includes:

the composite event is filtered according to a preset filtering condition; and the filtered composite event is displayed according to the preset displaying manner.

In this embodiment of the present disclosure, in the process of displaying the matching events, filtering conditions can also be added. Only when any one of the two or more events in the composite event cannot be filtered out by a certain filtering condition, the two or more events can be displayed.

It should also be noted that there are different displaying behavior definitions for the composite event according to the influence relationships between different events. Event 1 and Event 2 described above are also taken as an example to illustrate the displaying behavior definition.

Causal relationship: Broadcasting of Event 1 is stopped (which is not interrupted), and Event 2 is broadcast. The icon of Event 2 is associated with Event 1.

Influence amplification relationship: Broadcasting of Event 1 is stopped (which is not interrupted), and Event 2 is broadcast. The icon of Event 2 is enhanced, and Event 1 is added.

Influence attenuation relationship: If the broadcasting of Event 1 is not completed, the broadcasting of Event 2 is delayed, and the broadcasting time of Event 2 is shortened. The icons of the two events are merged.

Time series relationship: Event 1 and Event 2 are broadcast, and voices are merged, namely, Event 2 and Event 1 are merged.

New event generation relationship: Broadcasting of Event 1 is stopped (which is not interrupted), and Event 2 is broadcast. The icon of Event 2 is enhanced; Event 1 is added; and a new event prompt is added.

In some embodiments, that the composite event is displayed according to the preset displaying policy includes:

the composite event is broadcast to a first terminal located within a preset distance range of the terminal device.

In this embodiment of the present disclosure, after the composite event is generated, the composite event can be broadcast to the first terminal (such as a vehicle-mounted device) located within the preset distance range of the terminal device and communicating with the terminal device, and the first terminal can be updated as the first terminal moves or a distance between the first terminal and the terminal device changes, and the composite event is sent to the updated first terminal.

Figure 7:
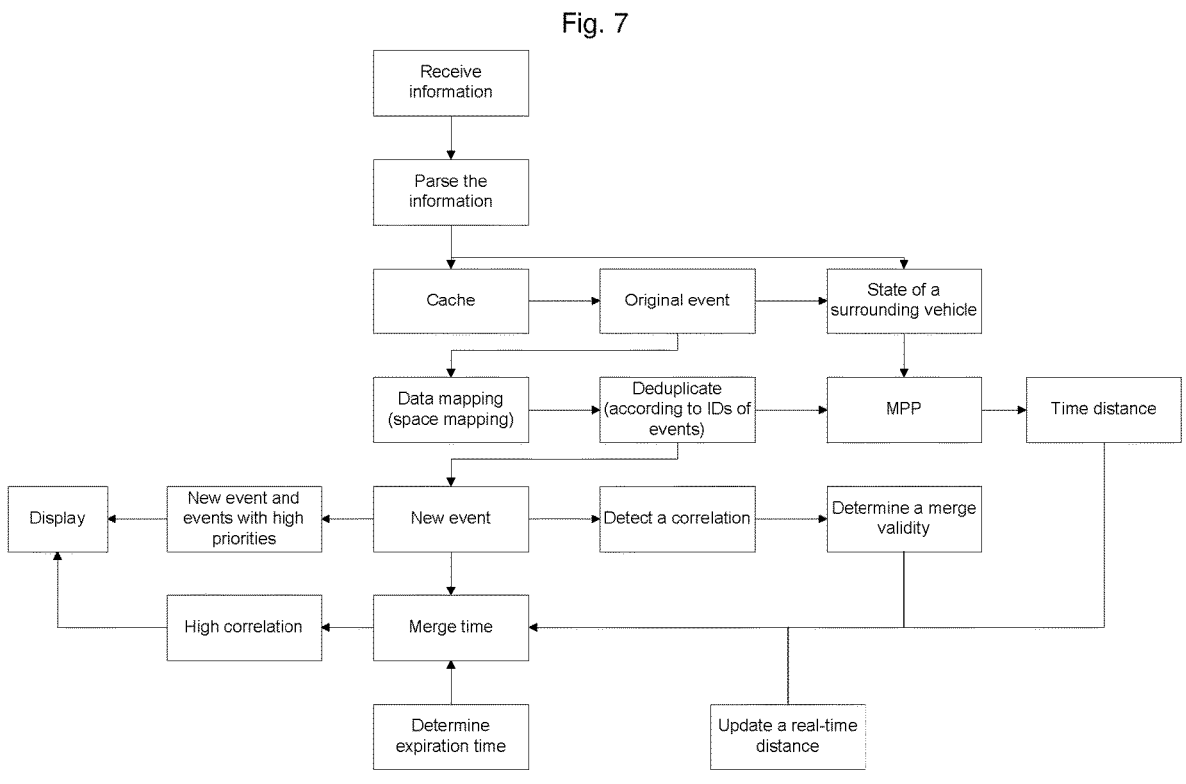
FIG. 7 is a second specific flow chart of an information processing method according to an embodiment of the present disclosure.

A flow of the information processing method is specifically described below in combination with FIG. 7.

Firstly, the event information sent by the information sensor device is received, and the event information is parsed and cached to obtain states of surrounding vehicles. Original event information is determined from the cached event information, and data mapping is performed on an original event. The event information is deduplicated according to Identity Documents (IDs) of events. In a case that new event information is received, a correlation is detected between the new event information and the original event. In a case that the new event information is correlated to the original event, a merge validity is determined. After it is determined that merging is possible, the new event information and the original event are merged to generate a composite event, and events with higher correlation are displayed. In a case that there is no correlation, it is determined that the new event and events with relatively high priorities are displayed. While the composite event is generated, a Maximum Probable Path (MPP) and a time distance between a surrounding vehicle and the current terminal are determined according to the state of the surrounding state. The composite event is broadcast to the surrounding vehicle according to the MPP distance and the time distance, and vehicles to which the composite event needs to be broadcast are updated as a real-time distance of the surrounding vehicle changes. An expiration of the composite event also needs to be determined. After it is determined that the composite event is expired, displaying and broadcasting are stopped.

In some embodiments, the method further includes:

in an automatic driving mode of a vehicle, a driving control policy is generated according to the composite event; and the vehicle is controlled to automatically drive according to the driving control policy.

In this embodiment of the present disclosure, when the vehicle is in the automatic driving mode, the driving policy is generated based on the composite event, and automatic driving is performed according to the driving policy.

It should be noted that in this embodiment of the present disclosure, a determining rule template is defined for the composite event, which includes design of a time windows, design of a location window, and a logical relationship of events. The nature of a composite event is defined according to a correlation relationship of the composite event on a decision-making node, and a displaying behavior is defined according to the nature of the composite event, which ensures that decision-making homogeneous information is merged when reaching a user.

With the development of a cooperative vehicle infrastructure system, there will be more and more composite events triggered by single-point events. Users will also have higher and higher requirements for information displaying. The composite events are used to optimize information processing not only brings a new experience to information displaying, but also brings a new inputting manner for driving decisions.

The embodiments of the present disclosure improve the information absorption efficiency and improve decision-making efficiency. Conflicts are processed using event correlation. The diversity and individuality of information displaying are improved.

Figure 8:
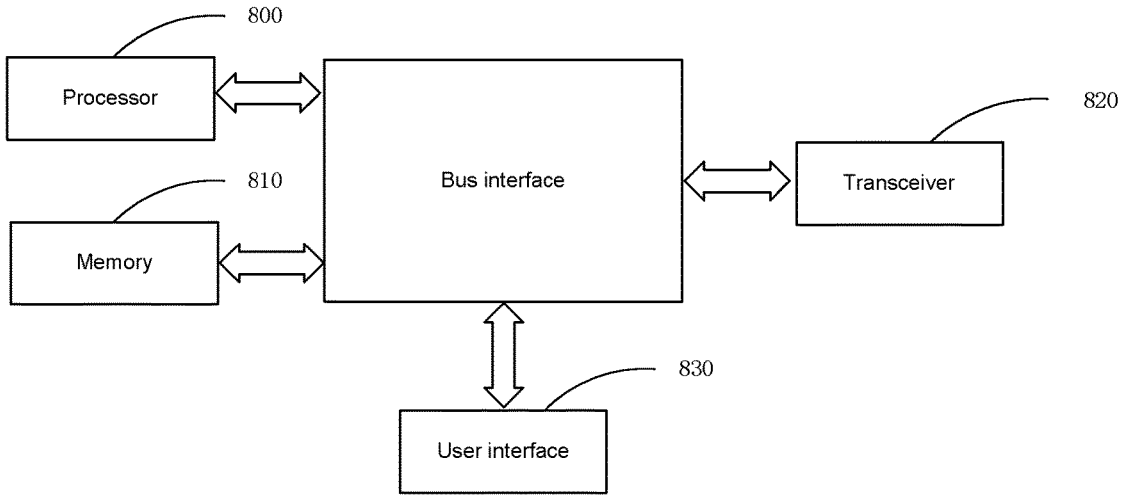
FIG. 8 is a schematic structural diagram of a terminal device according to an embodiment of the present disclosure.

As shown in FIG. 8, an embodiment of the present disclosure further provides a terminal device, including a processor 800; and a memory 810 connected to the processor 800 through a bus interface. The memory 810 is configured to store programs and data used by the processor 800 during operations. The processor 800 invokes and executes the programs and data stored in the memory 810.

The terminal device further includes a transceiver 820. The transceiver 820 is connected to a bus interface and configured to receive and transmit data under the control of the processor 800. The processor 800 is configured to read the programs in the memory 810.

In some embodiments, the transceiver 820 is configured to receive a plurality of pieces of event information sent by an information sensor device.

The processor 800 is configured to merge, in a case that at least two target events among the plurality of pieces of event information are driving decision-making homogeneous events, the at least two target events to generate a composite event, wherein the driving decision-making homogeneous events are events having a preset influence relationship.

In some embodiments, the processor 800 is further configured to display the composite event according to a preset displaying manner. The displaying manner includes at least one of the following manners: voice, text, and icon.

In some embodiments, the processor 800 is further configured to: determine, according to a preset time range, at least two first events from the plurality of pieces of event information received in sequence; and determine the at least two target events from the at least two first events according to a preset expiration date range. That is, it can also be understood that the processor 800 is further configured to: determine at least two first events from the plurality of pieces of event information received in sequence within a preset time range; and determine the at least two target events from the at least two first events according to a preset expiration date range.

In some embodiments, the preset influence relationship includes at least one of the following items:

a causal relationship, the causal relationship being configured to indicate that a first target event is a cause of a second target event;

an influence amplification relationship, the influence amplification relationship being configured to indicate that an effect of the second target event is amplified after the first target event occurs;

an influence attenuation relationship, the influence attenuation relationship being configured to indicate that an effect of the second target event is attenuated after the first target event occurs;

a time series relationship, the time series relationship being configured to indicate that the second target event occurs after the first target event; and a new event generation relationship, the new event generation relationship being configured to indicate that the first target event and the second target event cause occurrence of a third target event.

In some embodiments, the processor 800 is specifically configured to perform merging processing on the composite event according to a preset composite event template to generate the composite event;

the preset composite event template includes: a triggering event of the at least two target events, a conditional event in the at least two target events, action information established according to the at least two target events, and displaying behavior information for displaying the at least two target events;

wherein the preset composite event template further includes time information and location information of the conditional event; and the displaying behavior information includes at least one of the following: voice broadcast information and icon information.

In some embodiments, the processor 800 is further specifically configured to filter the composite event according to a preset filtering condition; and display the filtered composite event according to the preset displaying manner.

In some embodiments, the processor 800 is further specifically configured to broadcast the composite event to a first terminal located within a preset distance range of the terminal device.

In some embodiments, the processor 800 is further specifically configured to: in an automatic driving mode of a vehicle, generate a driving control policy according to the composite event; and control the vehicle to automatically drive according to the driving control policy.

In FIG. 8, a bus architecture may include any number of interconnected buses and bridges, and is particularly formed by linking one or more of processors represented by the processor 800 and the various circuits of memories represented by the memory 810 together. The bus architecture may also link various other circuits such as peripherals, voltage regulators and power management circuits, which are well known in the art and, therefore, will not be further described herein. A bus interface provides an interface. The transceiver 820 may be a plurality of elements, namely including a transmitter and a transceiver and providing units that communicate with various other apparatuses on a transmission medium. For different terminals, a user interface 830 may also be an interface capable of externally and internally connecting desired devices, and the connected devices include, but not limited to, a keypad, a display, a speaker, a microphone, a joystick, and the like. The processor 800 is responsible for managing the bus architecture and performing usual processing, and the memory 810 may store data used when the processor 800 performs operations.

Figure 9:
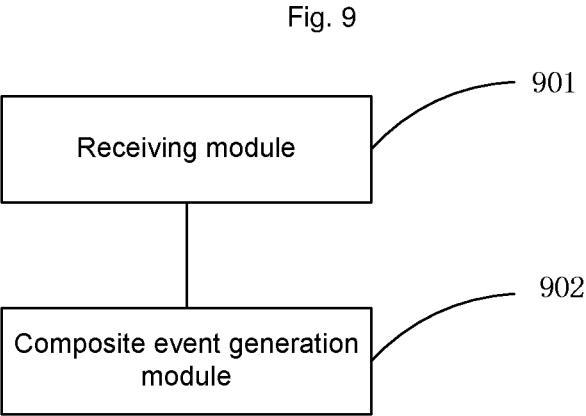
FIG. 9 is a schematic structural diagram of an information processing apparatus according to an embodiment of the present disclosure.

As shown in FIG. 9, an embodiment of the present disclosure further provides an information processing apparatus, applied to a terminal device and including:

a receiving module 901, configured to receive a plurality of pieces of event information sent by an information sensor device; and a composite event generation module 902, configured to merge, in a case that at least two target events among the plurality of pieces of event information are driving decision-making homogeneous events, the at least two target events to generate a composite event, wherein the driving decision-making homogeneous events are events having a preset influence relationship.

In this embodiment of the present disclosure, by means of receiving a plurality of pieces of event information sent by an information sensor device, merging, in a case that at least two target events among the plurality of pieces of event information are driving decision-making homogeneous events, the at least two target events to generate a composite event, wherein the driving decision-making homogeneous events are events having a preset influence relationship, so that the receiving efficiency of V2X information can be improved, and event conflicts are processed by using the relevance of the events, which prevents the problem of disconnection of the occurrence of the plurality of events from the decision-making process of a driver.

In some embodiments, the apparatus further includes:

a displaying module, configured to display the composite event according to a preset displaying manner; and the displaying manner includes at least one of the following manners: voice, text, and icon.

In some embodiments, the apparatus further includes:

a first determining module, configured to determine, according to a preset time range, at least two first events from the plurality of pieces of event information received in sequence; and a second determining module, configured to determine the at least two target events from the at least two first events according to a preset expiration date range.

That is, the apparatus further includes: a first determining module, configured to determine at least two first events from the plurality of pieces of event information received in sequence within a preset time range; and a second determining module, configured to determine the at least two target events from the at least two first events according to a preset expiration date range.

In some embodiments, the preset influence relationship includes at least one of the following items:

a causal relationship, the causal relationship being configured to indicate that a first target event is a cause of a second target event;

an influence amplification relationship, the influence amplification relationship being configured to indicate that an effect of the second target event is amplified after the first target event occurs;

an influence attenuation relationship, the influence attenuation relationship being configured to indicate that an effect of the second target event is attenuated after the first target event occurs;

a time series relationship, the time series relationship being configured to indicate that the second target event occurs after the first target event; and a new event generation relationship, the new event generation relationship being configured to indicate that the first target event and the second target event cause occurrence of a third target event.

In some embodiments, the composite event generation module 902 includes:

a composite event generation unit, configured to perform merging processing on the composite event according to a preset composite event template to generate the composite event;

the preset composite event template includes: a triggering event of the at least two target events, a conditional event in the at least two target events, action information established according to the at least two target events, and displaying behavior information for displaying the at least two target events;

wherein the preset composite event template further includes time information and location information of the conditional event; and a displaying unit, configured to implement that the displaying behavior information includes at least one of the following: voice broadcast information and icon information.

In some embodiments, the display unit is further configured to:

filter the composite event according to a preset filtering condition; and display the filtered composite event according to the preset displaying manner.

In some embodiments, the display unit is further configured to:

broadcast the composite event to a first terminal located within a preset distance range of the terminal device.

In some embodiments, the apparatus further includes:

a driving policy generation module, configured to: in an automatic driving mode of a vehicle, generate a driving control policy according to the composite event; and a control module, configured to control the vehicle to automatically drive according to the driving control policy.

It should be noted that the information processing apparatus provided in this embodiment of the present disclosure is an apparatus capable of executing the above information processing method, and all the embodiments of the above information processing method are applicable to the apparatus and can achieve the same or similar technical effects.

It should be noted that the division of the above modules is only a logical function division, which can be fully or partially integrated into a physical entity or physically separated during actual implementation. Further, these modules can all be implemented in the form of invoking software by a processing element, or can be all implemented in the form of hardware. Or, some modules can be implemented in the form of invoking software by a processing element, and some modules can be implemented in the form of hardware. For example, the first determining module can be a separately arranged processing element or implemented in a chip of the aforementioned apparatus. In addition, the first determining module can also be stored in the memory of the aforementioned apparatus in the form of a program code, and is invoked and executed by a processing element of the aforementioned apparatus. The implementation of other modules is similar to that of the first determining module. In addition, all or part of these modules can be integrated together or implemented separately. The processing element described here can be an integrated circuit having a signal processing capability. In the implementation process, the various steps of the above method or the various modules can be completed by using integrated logic circuits of hardware in the processing element or using software instructions.

For example, the various modules, units, subunits, or submodules can be one or more integrated circuits configured to implement the above method, for example: one or more application specific integrated circuits (ASICs), one or more digital signal processors (DSPs), one or more field programmable gate arrays (FPGAs), or the like. For another example, when a certain module above is implemented in the form of invoking a program code by a processing component, the processing element can be a general-purpose processor, such as a central processing unit (CPU) or other processors that can invoke a program code. For example, these modules can be integrated together and implemented in the form of system-on-a-chip (SOC).

The terms "first", "second", etc. in the specification and claims of the present disclosure are used to distinguish similar objects, and are not necessarily used to describe a specific sequence or a precedence order. It should be understood that the data used in this way are interchangeable under appropriate circumstances so that the embodiments of the present disclosure described herein can be implemented in an order other than those illustrated or described herein, for example. In addition, the terms "include" and "have" as well as any of their variations are intended to cover non-exclusive inclusions. For example, processes, methods, systems, products, or devices that include a series of steps or units are not necessarily limited to those steps or units clearly listed below, but may include other steps or units that are not clearly listed or are inherent to these processes, methods, products, or devices. In addition, "and/or" used in the specification and claims represents at least one of connected objects. For example, A and/or B and/or C represents seven cases: individual A, individual B, individual C, both A and B, both B and C, both A and C, and A, B, and C. Similarly, "at least one of A and B" in this specification and claims should be understood as "individual A, individual B, or both A and B".

An embodiment of the present disclosure further provides a readable storage medium, wherein the readable storage medium stores programs or instructions, wherein the programs or instructions, when executed by a processor, implement the steps of any one of the above information processing methods.

In addition, it should be pointed out that in the apparatus and method of the present disclosure, it is evident that the respective components or steps can be decomposed and/or recombined. These decompositions and/or recombinations should be considered as equivalent solutions to the present disclosure. Moreover, the steps of executing the above series of processing can naturally be executed in chronological order according to the description, but they do not necessarily need to be executed in chronological order. Some steps can be executed in parallel or independently of each other. Those of ordinary skill in the art can understand all or any steps or components of the method and apparatus of the present disclosure can be implemented in hardware, firmware, software, or a combination of hardware, firmware, and software in any computing apparatus (including a processor, a storage media, and the like) or a network of computing apparatuses, This can be implemented by those of ordinary skill in the art by using their basic programming skills after reading the description of the present disclosure.

Therefore, the objectives of the present disclosure can also be achieved by running a program or a group of programs on any computing apparatus. The computing apparatus can be a well-known universal apparatus. Therefore, the objectives of the present disclosure can also be achieved solely by providing a program product containing program codes for implementing the method or apparatus. That is, such a program product also constitutes the present disclosure, and a storage medium storing such a program product also constitutes the present disclosure. Obviously, the storage medium can be any well-known storage medium or any storage medium that will be developed in the future. It should also be pointed out that in the apparatus and method of the present disclosure, it is evident that the respective components or steps can be decomposed and/or recombined. These decompositions and/or recombinations should be considered as equivalent solutions to the present disclosure. Moreover, the steps of executing the above series of processing can naturally be executed in chronological order according to the description, but they do not necessarily need to be executed in chronological order. Some steps can be executed in parallel or independently of each other.

The above describes the preferred implementations of the present disclosure. It should be pointed out that those of ordinary skill in the art can further make several improvements and retouches without departing from the principles of the present disclosure. These improvements and retouches also all fall within the protection scope of the present disclosure.

The invention claimed is:

1. An information processing method, applied to a terminal device and comprising:
   receiving a plurality of pieces of event information sent by an information sensor device; and
   merging, in a case that at least two target events among the plurality of pieces of event information are driving decision-making homogeneous events, the at least two target events to generate a composite event, wherein merging the at least two target events further comprises: performing merging processing on the composite event according to a preset composite event template to generate the composite event; the preset composite event template comprises: a triggering event of the at least two target events, a conditional event in the at least two target events, action information established according to the at least two target events, and displaying behavior information for displaying the at least two target events; wherein the preset composite event template further comprises time information of the conditional event and location information of the conditional event; and the displaying behavior information comprises at least one of the following: voice broadcast information and icon information,
   wherein the driving decision-making homogeneous events are events having a preset influence relationship;
   in an automatic driving mode of a vehicle, generating a driving control policy according to the composite event; and
   controlling the vehicle to automatically drive according to the driving control policy.

2. The information processing method according to claim 1, wherein the method further comprises:

displaying the composite event according to a preset displaying manner; and the displaying manner comprises at least one of the following manners: voice, text, and icon.

3. The information processing method according to claim 1, wherein before merging, in a case that the at least two target events among the plurality of pieces of event information are the driving decision-making homogeneous events, the at least two target events to generate the composite event, the method further comprises:

determining at least two first events from the plurality of pieces of event information received in sequence within a preset time range; and determining the at least two target events from the at least two first events according to a preset expiration date range.

4. The information processing method according to claim 1, wherein the preset influence relationship comprises at least one of the following items:

a causal relationship, the causal relationship being configured to indicate that a first target event is a cause of a second target event;

an influence amplification relationship, the influence amplification relationship being configured to indicate that an effect of the second target event is amplified after the first target event occurs;

an influence attenuation relationship, the influence attenuation relationship being configured to indicate that an effect of the second target event is attenuated after the first target event occurs;

a time series relationship, the time series relationship being configured to indicate that the second target event occurs after the first target event; and a new event generation relationship, the new event generation relationship being configured to indicate that the first target event and the second target event cause occurrence of a third target event.

5. The information processing method according to claim 2, wherein displaying the composite event according to the preset displaying manner comprises:

filtering the composite event according to a preset filtering condition; and displaying the filtered composite event according to the preset displaying manner.

6. The information processing method according to claim 2, wherein displaying the composite event according to the preset displaying manner comprises:

broadcasting the composite event to a first terminal located within a preset distance range of the terminal device.

7. A terminal device, comprising a processor, a memory, and programs or instructions stored on the memory and runnable on the processor, wherein, when the programs or instructions executed by the processor, the processor is enabled to:

receive a plurality of pieces of event information sent by an information sensor device; and merge in a case that at least two target events among the plurality of pieces of event information are driving decision-making homogeneous events, the at least two target events to generate a composite event, wherein merging the at least two target events further comprises: perform merging processing on the composite event according to a preset composite event template to generate the composite event; the preset composite event template comprises: a triggering event of the at least two target events, a conditional event in the at least two target events, action information established according to the at least two target events, and displaying behavior information for displaying the at least two target events; wherein the preset composite event template further comprises time information of the conditional event and location information of the conditional event; and the displaying behavior information comprises at least one of the following: voice broadcast information and icon information, wherein the driving decision-making homogeneous events are events having a preset influence relationship;

in an automatic driving mode of a vehicle, generate a driving control policy according to the composite event; and control the vehicle to automatically drive according to the driving control policy.

8. The terminal device according to claim 7, wherein the processor is further enabled to:

display the composite event according to a preset displaying manner; and the displaying manner comprises at least one of the following manners: voice, text, and icon.

9. The terminal device according to claim 7, wherein before merging, in a case that the at least two target events among the plurality of pieces of event information are the driving decision-making homogeneous events, the at least two target events to generate the composite event, the processor is further enabled to:

determine at least two first events from the plurality of pieces of event information received in sequence within a preset time range; and determine the at least two target events from the at least two first events according to a preset expiration date range.

10. The terminal device according to claim 7, wherein the preset influence relationship comprises at least one of the following items:

a causal relationship, the causal relationship being configured to indicate that a first target event is a cause of a second target event;

an influence amplification relationship, the influence amplification relationship being configured to indicate that an effect of the second target event is amplified after the first target event occurs;

an influence attenuation relationship, the influence attenuation relationship being configured to indicate that an effect of the second target event is attenuated after the first target event occurs;

a time series relationship, the time series relationship being configured to indicate that the second target event occurs after the first target event; and a new event generation relationship, the new event generation relationship being configured to indicate that the first target event and the second target event cause occurrence of a third target event.

11. The terminal device according to claim 8, wherein displaying the composite event according to the preset displaying manner comprises:

filtering the composite event according to a preset filtering condition; and displaying the filtered composite event according to the preset displaying manner.

12. The terminal device according to claim 8, wherein displaying the composite event according to the preset displaying manner comprises:

broadcasting the composite event to a first terminal located within a preset distance range of the terminal device.

\* \* \* \* \*